United States Patent [19]

Peterson et al.

[11] 4,320,359

[45] Mar. 16, 1982

[54] OPTICAL BEAM MODE CONTROLLED LASER SYSTEM

[75] Inventors: Phillip R. Peterson; Athanasios Gavrielides; John H. Erkkila, all of Albuquerque, N. Mex.

[73] Assignee: The United States of America as represented by the Secretary of the Air Force, Washington, D.C.

[21] Appl. No.: 52,162

[22] Filed: Jun. 26, 1979

[51] Int. Cl.$^3$ .......................................... H01S 3/098
[52] U.S. Cl. ....................................... 372/18; 372/19; 372/94
[58] Field of Search .................. 331/94.5 UL, 94.5 N, 331/94.5 M, 94.5 C, 94.5 G

[56] References Cited

U.S. PATENT DOCUMENTS 3,611,181 10/1971 Lary et al. ........................... 331/94.5
3,702,973 11/1972 Daugherty et al. .......... 331/94.5 PE
3,845,409 10/1974 Wada et al. ....................... 331/94.5 C
3,969,688 8/1976 Freiberg et al. ................ 331/94.5 C
4,126,832 11/1978 Schlossberg et al. ........... 331/94.5 C

OTHER PUBLICATIONS

"Gain Spiking and Mode-Beating Control by Signal Injection in CO$_2$ Lasers", by Cason et al., Jour. Appl. Phys., vol. 48, No. 6, Jun. 1977.

"An Indepently Controllable Multiline Laser Resonator and Its Use in Multifrequency Injection Locking", by Sheffield et al., Appl. Phys. Lett., vol. 29, No. 9, Nov. 1976.

Primary Examiner—William L. Sikes
Assistant Examiner—Léon Scott, Jr.
Attorney, Agent, or Firm—Donald J. Singer; Jacob N. Erlich

[57] ABSTRACT

An optical beam mode controlled high power laser system having a resonator which incorporates therein as one of the reflective elements a high efficiency diffraction grating. Impinging upon the diffraction grating is not only the high power resonator laser beam, but also an injected mode controlling laser beam of preselected wavelength. Each beam is directed at the diffraction grating at a predetermined angle in order for the grating to direct away therefrom a combined beam of radiant energy having high power and being locked to the preselected wavelength of the injected laser beam. It is this high power laser beam of preselected wavelength which is output from the laser system.

7 Claims, 4 Drawing Figures

FIG. 1
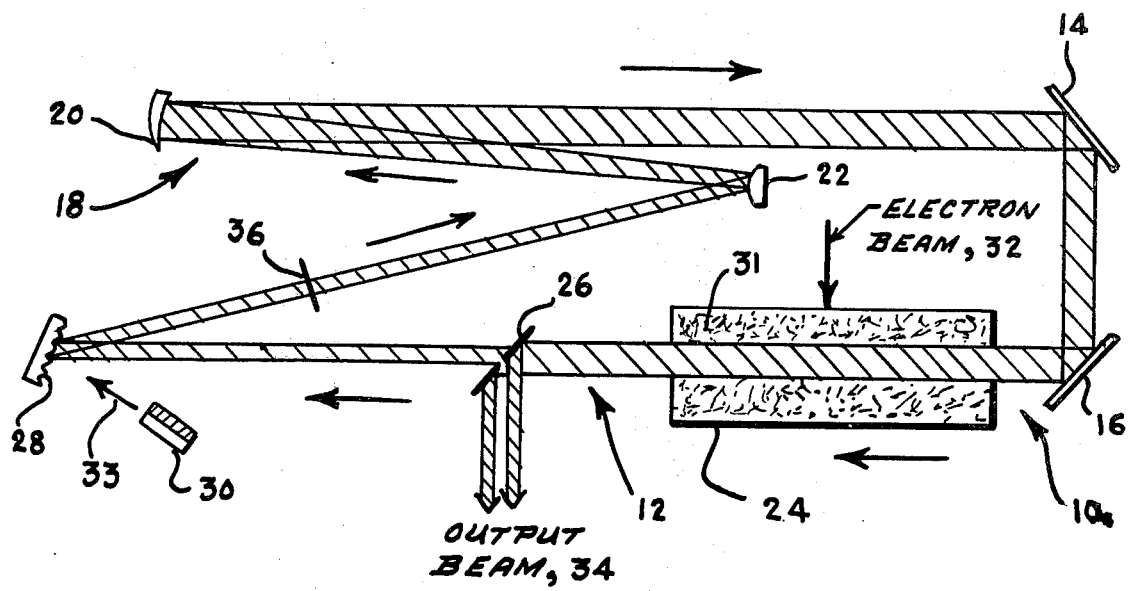
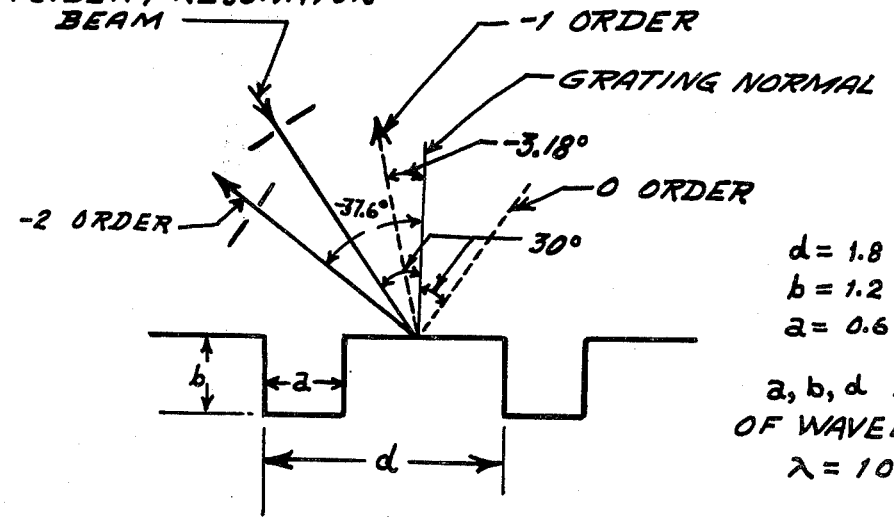
$d = 1.8 \lambda$
$b = 1.2 \lambda$
$a = 0.6 \lambda$
a, b, d IN UNITS OF WAVELENGHT
$\lambda = 10.6 \mu m$
FIG. 3

OPTICAL BEAM MODE CONTROLLED LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to electro-dynamic laser systems, and, more particularly, to an electro-dynamic laser system which is capable of controlling the optical beam mode thereof by the utilization of an injected laser beam in conjunction with a specifically designed diffraction grating.

Since the development of the first working lasers, considerable time and effort has been expended in the search for high power output laser systems. The possible applicatons of high power lasers are unlimited in the fields of communication, manufacturing, construction, medicine, space exploration, and defense.

The gas laser has grown out of the initial laser effort and is representative of one of the more sophisticated laser techniques which has the capability of providing very high power radiation output, due primarily to the large gas handling capability characteristic of such a system and due to the large quantity of energy which can be added to the gases flowing in such systems.

While the preferred embodiment of the present invention will be described in connection with an electrically excited nitrogen ($N_2$), carbon dioxide ($CO_2$) and helium (He) laser, it may be applied to other systems where a conducting ionized gas is required or useful and including, but not restricted to, gas constituents other than $N_2$, $CO_2$ and He as well as other lasing systems.

In order to bring about laser action two conditions must be fulfilled: (1) population inversion must be achieved and (2) an avalanche process of photon amplification must be established in a suitable cavity or resonator such as, for example, an optical cavity, optical resonator or resonant cavity. Population inversion can, for example, be accomplished if (1) the atomic system has a least three levels (one ground and at least two excited levels) which can be involved in the excitation and emission processes and (2) the lifetime of one of the most energetic of the excited states is much longer than that of the other or others.

When a system is in a condition where light (photon) amplification is possible, laser action can be achieved by providing (1) means for stimulating photon emission from the long-lived state, and (2) means for causing photon amplification to build up to extremely high values. In the usual embodiment, this is accomplished by fashioning the medium containing the active atoms into a chamber with perfectly (as far as possible) parallel ends polished so highly that the surface roughness is measured in terms of the wave length of the laser. The ends may be simply polished metal or they may be silvered or dielectric coated so that they behave as mirrors which reflect photons coming toward them from the interior of the chamber. Such a structure, whether the mirrors are within or outside the chamber, is called the resonator, that is, the optical or resonant cavity.

If now pumping means, such as for example, an electric discharge acts on the medium and brings about population inversion of the long-lived state with respect to another lower energy excited state even though the long-lived state is only relatively long-lived, in a small fraction of a second there will be spontaneous emission of photons. Most of these photons will be lost to the medium but some of them will travel perpendicular to the ends and be reflected back and forth many times by the mirrors. As these photons traverse the active medium, they stimulate emission of photons from all atoms in the long-lived state which they encounter. In this way the degree of light amplification in the medium increases extraordinarily and because the photons produced by stimulated emission have the same direction and phase as those which stimulate them, and assuming the optical quality of the laser media is suitable, the electromagnetic radiation field inside the chamber or cavity is coherent. In order to extract a useful beam of this coherent light from the cavity, one (or both of the mirrors is made slightly transmissive. A portion of the highly intense beam leaks through the mirror, and emerges with regularly spaced wave fronts. This is the laser beam.

In the electro-dynamic laser an electron beam is fired into a gas filled optical or resonant cavity so as to provide electrons. The use of an electron beam for laser pumping is fully described in U.S. Pat. No. 3,702,973 issued Nov. 14, 1972. These electrons are subject to the sustainer voltage which adds energy to them, heating them to a desired temperature. In the case of the $CO_2$ laser, the electrons transfer some of their energy to $N_2$ and $CO_2$ in the cavity by collision processes, pumping (quantum mechanically) these gases to an upper laser level. The $N_2$ transfers its energy to the $CO_2$. The $CO_2$ relaxes to a lower level with the emission of radiation. The cavity is bounded with mirrors which reflect some of the simulated emission back into the cavity stimulating more emission, etc. The radiation is eventually led out of the cavity in the form of a laser beam.

To date, the means to modify the gain-switched spike turn-on signal, in the electro-dynamic laser system has been accomplished by injecting an external beam into the resonator or resonant cavity through a small hole drilled in one of the cavity mirrors such as described in a paper entitled "Gain Spiking and mode-beating control by signal injection in $CO_2$ lasers" by Charles Cason et al, Journal of Applied Physics, vol. 48, June 1977, pgs 2531–2536. With such an approach, one is limited to low injection powers and to irradiating only a small area of the resonator gain region therefore substantially reducing the reliability of mode control.

SUMMARY OF THE INVENTION

The laser system of this invention overcomes the problems set forth in detail hereinabove by incorporating within the resonator of a high power laser system a high-efficiency grating. This grating diffracts or reflects, simultaneously, both the resonator laser beam and a low power external-mode-controlling laser beam of preselected wavelength incident on the grating from a different angle. The laser system of this invention will thereby permit gain-switched spike suppression, control of cavity tuning, and cavity mode selection.

Making up the laser system of this invention is an electro-dynamic laser which employs therein, preferably, a ring resonator in combination with a mode injection laser. The ring resonator is made up of a plurality of directing elements, a high efficiency grating, a beam expander, an output coupler, and a laser gain region.

The elements of the resonator are in optical alignment with each other as well as in alignment with the gain region and the mode injection laser beam.

For an understanding of this invention we will consider the amplified resonator beam as it exits the gain region and encounters a conventional output coupler. Here, part of the resonator beam is outcoupled as the laser beam with the remaining portion of the beam continuing to propagate along the resonator optic axis striking the diffraction grating at an angle of 30° to the normal. At this point, a diffracted order of the injection beam at a preselected wavelength propagates colinearly with one of the diffracted orders of the resonator beam. These beams are subsequently magnified to the cross sectional area of the gain region by an off-axis beam expander and redirected through the laser gain region wherein the resonator beam is locked onto the preselected wavelength of the injected beam.

It is therefore an object of this invention to provide a laser system which permits gain-switched spike suppression.

It is another object of this invention to provide a laser system which permits control of resonator tuning.

It is a further object of this invention to provide a laser system which permits cavity mode selection.

It is still a further object of this invention to provide a laser system which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of the laser system of this invention;

FIG. 3 is a schematic representation of the grating of the laser system of this invention showing the resonator beam incident thereupon.

DETAILED DESCRIPTION OF THE PREFERRED EMBODIMENT

Figure 2:
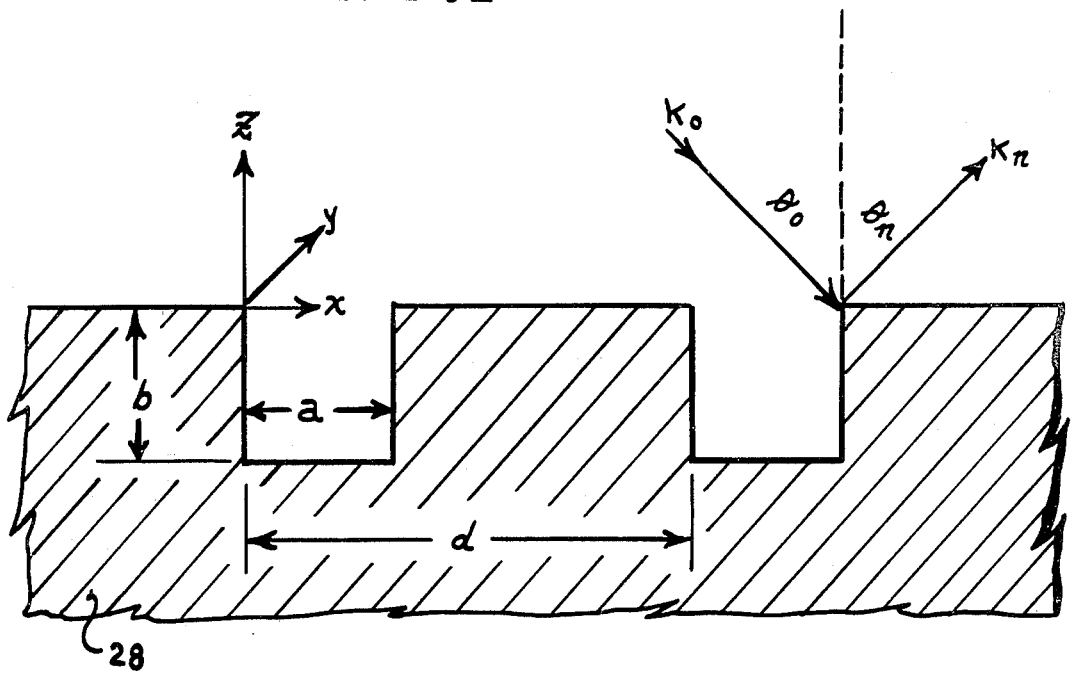
FIG. 2 is a schematic representation of the grating utilized with the laser system of this invention.

Reference is now made to FIG. 1 of the drawing which schematically illustrates the laser system 10 of this invention. Although not limited thereto, laser system 10 preferably incorporates therein a ring resonator 12. The resonant or optical cavity, defined by resonator 12, is made up of a pair of reflecting elements, shown in FIG. 1 of the drawing as mirrors 14 and 16, a beam expander 18 formed by a pair of mirrors 20 and 22, a laser gain region 24, an output coupler in the form of, for example, hole scraper mirror 26 and a high efficiency diffraction grating 28 to be described in detail hereinbelow in conjunction with FIGS. 2-4 of the drawing. In addition to the above elements being in optical alignment with each other a mode injection laser 30 also has its injection laser beam 33 of preselected wavelength optically aligned with the high efficiency diffraction grating 28.

An active medium 31 located within gain region 24 of resonator 12 is in the form of any suitable gas capable of producing a lasing action such as a mixture comprising 16% $CO_2$, 34% $N_2$ and 50% He which may be supplied from any suitable conventional source (not shown). Laser operation takes place when a suitable electron beam 32 from a conventional electron source such as an electron gun (not shown) produces free electrons and ionizes the gaseous laser medium 31 in a conventional manner as described in U.S. Pat. No. 3,702,973. The above action produces a beam of radiant energy which propagates within resonator 12 and a portion of which is output from laser system 10 by means of output coupler 26. The remainder of the beam which is not output from laser system 10 continues to propagate within the resonator 12. With the instant invention an additional input in the form of a low power injection beam 33 of approximately 1 W from mode injection laser 30 strikes the high efficiency diffraction grating of resonator 12. At this point, the diffracted order of the injection beam 33 propagates colinearly with one of the diffracted orders of the originally produced resonator beam and continues therewith toward mode symmetrizing aperture 36. The combined beams produce the desired high output laser beam 34 of approximately 100 KW which is eventually output from system 10. As a result of the combining of the injection beam 33 and the undeviated portion of the laser beam transmitted by output coupler 26, laser beam 34 is produced which is locked to the wavelength of injection beam 33. In this invention, for example, the resultant wavelength may be 10.6 $\mu$m.

The actual combining of the resonator beam and the injection beam is assisted by a conventional mode symmetrizing aperture 36 which is optically interposed within resonator 12 between grating 28 and beam expander 18. The function of aperture 36 is to correct for the area distortion of the beams introduced by grating 28. These beams are then magnified to the cross sectional area of gain region 24 by conventional off-axis beam expander 18 and redirected through the laser gain region 24.

For proper operation of the laser system of this invention and in order to maximize the output derived therefrom the following analysis is presented:

There are two independent solutions for the diffracted power from lamellar gratings, depending on the two independent polarization directions of the incident beam, these are Transverse Electric (TE) and Transverse Magnetic (TM). For a working embodiment of the signal injection diffraction grating 28 in this invention we choose the former, Transverse Electric polarization state (the electric field parallel to the groove), however, the choice is independent of grating 28.

Initially we must solve Maxwell's equations for a bare, perfectly conducting lamellar grating 28, as shown in FIG. 2 of the drawing. This amounts to using plane wave solutions above grating 28 and solving the Helmholtz equation, subject to the appropriate boundary conditions in the groove. These two solutions are then joined across the surface (x, y, z=0) by the use of boundary conditions. The vector plane wave solution has two eigenstates corresponding to the electric field polarized perpendicular to the plane of incidence. In our development we consider the plane of incidence to be perpendicular to the groove profile.

In referring to the equations set forth hereinbelow as well as FIG. 2 of the drawing the following notations should be kept in mind; x, y, z define the coordinate system, d=period, b depth, a=width, $\theta_o$ the angle of incidence (positive to the left of the grating normal), $\theta_n$ the diffraction angle (negative to the left of normal) and $k_o = k = 2\pi$/wavelength. The following is presented to solve the signal injection grating 28 as well as the final solution parameters (contained in parenthesis). The specific values of these parameters can be obtained by a trial-and-error method.

The incident electric field is assumed to have complex amplitude $E_o$ and is propagating in the $k_o$ direction at an angle of incidence of $\theta_o$. The diffracted electric field is composed of a sum over complex Fourier amplitudes $A_n$ propagating in the direction $k_n$ at an angle $\theta_n$ as clearly shown in FIG. 2. Thus for $z \geq 0$ we have the solution $$E = E_o e^{i\beta_o x} e^{-\gamma_o zi} + \sum_{n=-\infty}^{+\infty} A_n e^{i\beta_n x} e^{i\gamma_n z} \quad (1)$$

where $\beta_o = k \sin \theta_o$, $\gamma_o = k \cos \theta_o$ and $k = 2\pi/\lambda$. The periodicity (d) of grating is contained in the grating equation $$\beta_n = k \sin \theta_n = \beta_o + \frac{2\pi n}{d} \quad (2)$$

with $$\gamma_n = (k^2 - \beta_n^2)^{\frac{1}{2}}, \quad |\sin \theta_n| \leq 1 \quad (3)$$
$$= i(\beta_n^2 - k^2)^{\frac{1}{2}}, \quad |\sin \theta_n| > 1$$

Equation (3) ensures that the evanescent waves decay away from the surface. We have also assumed the standard time dependence of exp $(-i\omega t)$.

The solution in the groove has to satisfy the boundary conditions that E tangential vanishes on the surface $x=0$, a and $z=-b$, and that it is continuous across $z=0$. Thus, the electric field has only a y component and a magnitude $$E_g = \sum_{m=1}^{\infty} B_m \sin \frac{m\pi x}{a} [e^{-i\lambda_m z} - e^{+2i\lambda_m b} e^{+i\lambda_m z}] \quad (4)$$

where b is the groove height and the separation constant $\lambda_m$ is related to the groove width a by $$\lambda_m = \left[ k^2 - \frac{(m\pi)^2}{a} \right]^{\frac{1}{2}} \quad k \geq \frac{m\pi}{a} \quad (5)$$

$$\lambda_m = i \left[ \left(\frac{m\pi}{a}\right)^2 - k^2 \right]^{\frac{1}{2}} \quad \frac{m\pi}{a} > k$$

with $\lambda_m$ imaginary representing the evanescent wave in the z-direction. Note that the $m=0$ solution is not allowed. The complex expansion coefficients $B_m$ are linked to the $A_n$'s by the boundary conditions along the $z=0$ surface.

The tangential electric field plane wave solutions at $z=0$ are $$E(x,o) = E_o e^{i\beta_o x} + \sum_n A_n e^{i\beta_n x}, 0 \leq x \leq a \quad (6)$$

and $$E(x,o) = E_o e^{i\beta_o x} + \sum_n A_n e^{i\beta_n x} = 0, a < x \leq d$$

and the tangential electric field for $z<0$ at the $z=0$ surface is $$E_g(x,o) = \sum_m B_m \sin \frac{m\pi x}{a} (1 - e^{2i\lambda_m b}), 0 \leq x \leq a \text{ and} \quad (7)$$
$$0, a < x \leq d$$

and
since for x: [a,d] the field is zero in the conductor. Settings Eqs. (6) and (7) equal, then multiplying by $$\int_o^d e^{-i\beta_l x}$$

and using the orthogonality of the exponentials on the interval (o,d) leads to the projection of $A_n$ $$A_n = \frac{1}{d} \sum_{m=1}^{\infty} B_m \frac{[1 - e^{+2i\lambda_m b}] \frac{m\pi}{a} [1 + (-1)^{m+1} e^{-i\beta_n a}]}{\frac{(m\pi)^2}{a} - \beta_n^2} - \quad (8)$$

$$E_o \delta_{on}$$

The values of the tangential magnetic fields on the $z=0$ surface are $$H_x = \frac{i}{\omega \mu} \frac{\partial E}{\partial z} \bigg|_{z=0}, 0 \leq x \leq a \quad (9)$$

$$H_x = j_s | z = 0, a < x \leq d$$

and $$H_x = \frac{i}{\omega \mu} \frac{\partial E_g}{\partial z} \bigg|_{z=0}, 0 \leq x \leq a \quad (10)$$

$$= 0 \, a < x \leq d$$

where $j_s$ is the surface current density. Setting Eqs. (10) and (11) equal, multiplying by sin $(\pi x)/a$ and integrating x: [o, a] leads to $$B_m = \quad (11)$$

$$\frac{2m}{a^2 \lambda_m} \frac{1}{[1 + e^{2i\lambda_m b}]} \left\{ \sum_n \frac{\gamma_n A_n [1 + (-1)^{m+1} e^{i\beta_n a}]}{\beta_n^2 - \frac{(m\pi)^2}{a}} + \right.$$

$$\left. \frac{E_o \gamma_o [1 + (-1)^{m+1} e^{i\beta_o a}]}{\frac{(m\pi)^2}{a} - o^2} \right\}$$

Combining Eqs. (8) and (11) gives the matrix equation $$A_n - \sum_{s=-\infty}^{+\infty} T_{sn} A_s = R_n', -\infty \leq n \leq +\infty \quad (12)$$

where $$T_{sn} = \sum_{m=1}^{\infty} Q_{sm} M_{mn} \quad (13)$$

$$R_n = - \sum_{m=1}^{\infty} X_m M_{mn} - E_o \delta_{on} \quad (14)$$

with $$Q_{nm} = \frac{2m\pi}{a^2 [1 + e^{2i\lambda_m b}]} \frac{\gamma_n [1 + (-1)^{m+1} e^{+i\beta_n a}]}{\beta_n^2 + \frac{(m\pi)^2}{a}} \cdot \frac{1}{\lambda_m} \quad (15)$$

$$M_{mn} = \frac{\pi}{ad} \frac{[1 - e^{2i\lambda_m b}] m [1 + (-1)^{m+1} e^{-i\beta_n a}]}{-\beta_n^2 + \frac{(m\pi)^2}{a}} \quad (16)$$

-continued $$x_m = \frac{E_o \gamma_o [1 + (-1)^{m+1} e^{i\beta o a}]}{\beta_o^2 - \frac{(m\pi)^2}{a}} \cdot \frac{2m\pi/a^2}{\lambda_m [1 + {}^{2i\lambda mb}]} \quad (17)$$

The solution to TE diffraction is obtained by solving the matrix equation (12) for the amplitudes $A_n$.

Equation (12) is an infinite number of complex linear equations with $A_n$ as unknowns and the coefficients $T_{sn}$ being infinite sums over the groove index m. Our method of solution is to arbitrarily truncate the number of equations as well as the sum over m. We then invert the matrix and solve for $A_n$. The size of the array and the number of terms in $T_{sn}$ are determined by the convergence of $A_n$ to within 0.001. This criterion can be easily satisfied by using an array which contains the first 10 orders i.e., $-10 \leq n \leq 10$, and a maximum m of about 40. In fact, many cases converge with fewer terms.

Therefore, knowing the desired output wavelength $\lambda$ for the electrically excited $N_2CO_2$ He laser system 10 of this invention, we choose, under the trial-and-error method, a reasonable angle of incidence (+30°) and period of the grating 28 (d=1.8$\lambda$). We want just three diffracted orders since there are three beams, feedback, injection and diagnostic. Using this information in Eq. (2) we obtain three diffracted orders at angles $\theta_o = +30$, $\theta_{-1} = 3.18°$, $\theta_{-2} = 37.8°$. The next step is to get the diffracted efficiencies ($|A_n|^2$) in these orders. To do so, we must solve Eq. (12), a standard matrix equation, with the accompanying equations Eqs. (13)–(17) along with Eq. (3) and Eq. (5). In order to proceed we choosse the depth (b=1.2$\lambda$) and width (a=0.6$\lambda$). Now everything is defined and by use of a well known converging truncation method solve Eq. (12). The above procedure also determines the values of m and n as is outlined hereinbelow. From this we obtain the diffraction efficiency of $|A_{-2}|^2 = 95\%$.

The grating parameters (d, a, b) and the wavelength $\lambda$ have now been fixed. Furthermore, we want one order of the diffracted injection laser beam to be colinear with $\theta_{-2}(=-37.8°)$ of the feedback beam; and again we want just 3 diffracted orders. Thus, returning to Eq. (2) we get the angle of incidence of the injection beam and find the diffracted orders are n=−1, 0, +1 with diffraction angles of $\theta_{-1} = -37.8°$, $\theta_o = -3.18°$, $\theta_{+1} = +30°$ for an angle of incidence of −3.18°. The remaining step is to use Eq. (12), and the associated equations, with the new angle of incidence along with the old values of a, b, d, $\lambda$. This gives the diffraction efficiency $|A_{-1}|^2 = 3.7\%$.

As a result of appropriate numerical substitution within the above equations it has been determined that a desirable high output having a wavelength of 10.6 μm can be accomplished with a diffraction grating 28 having a groove height, b, equal to 1.2$\lambda$, a groove width, a, equal to 0.6$\lambda$ and a periodicity, d, equal to 1.8$\lambda$.

Figure 4:
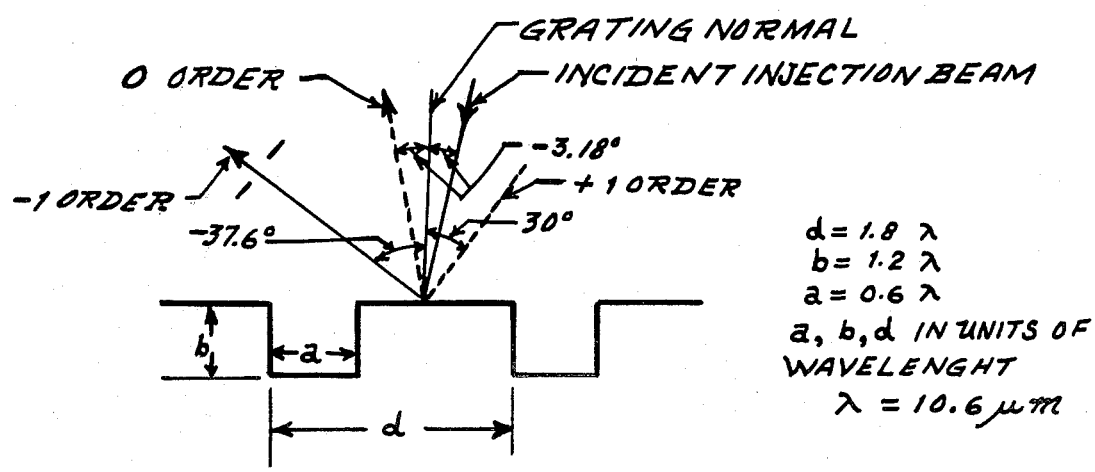
FIG. 4 is a schematic representation of the grating of the laser system of this invention showing the injection beam incident thereon.

Reference is now made to FIGS. 3 and 4 of the drawing which schematically represent the relation between the incident resonator beam and the incident injection beam 30 on grating 28, respectively. For the design considered here both the incident resonator beam and the incident injector beam each has only 3 diffracted orders. As a result of the above calculations 95% of the incident power is diffracted at an angle of −37.6° the normal. Colinear with this diffracted beam is the −1 diffracted order of the injection laser beam, at an efficiency of 3.7% if the injection beam is aligned at an angle of −3.18° to the grating normal. The other two diffracted orders of both beams are colinear; that is, the 0 (+1) order of the injection beam is colinear with the −1 (0) order of the resonator beam at an angle of −3.18° (+30°), respectively. These beams can be used for alignment and/or diagnostic purposes. Although this grating operates in the transverse electric configuration, in which the laser beam is polarized with its electric field parallel to the grooves, other designs for both the transverse electric and transverse magnetic operations can be employed similarly. For example, a transverse magnetic grating can be used with 99% of the resonator beam specularly reflected and 1% of the injection beam directed along the resonator beam. With such a configuration no mode symmetrizing is necessary.

Although this invention has been described with reference to a particular embodiment, it will be understood to those skilled in the art that this invention is also capable of further and other embodiments within the spirit and scope of the appended claims.

We claim:

1. An optical beam mode controlled high power laser system comprising:
   (a) a resonator, said resonator forming a resonant cavity and being defined by at least one reflective surface and a high efficiency diffraction grating in optical alignment with said reflective surface and means optically interposed between said reflective surface and said grating for containing a lasing medium therein;
   (b) a lasing medium located within said lasing medium containing means;
   (c) means operable with said lasing medium for initiating a lasing action therein in order to produce a coherent beam of high power radiant energy;
   (d) said grating being positioned with respect to said high power beam of radiant energy so as to receive said high power beam of radiant energy at a predetermined angle with respect thereto;
   (e) means optically aligned with said grating for producing a beam of low power coherent radiant energy at a preselected wavelength and directing said low power beam of radiant energy to said grating at a predetermined angle with respect thereto;
   whereby said grating directs therefrom a combined beam of radiant energy having high power and being locked to said preselected wavelength of said low power beam of radiant energy; and
   (f) means optically interposed between said lasing medium containing means and said grating for outcoupling from said resonant cavity said high power beam of radiant energy at said preselected wavelength as an output of said laser system;
   whereby said mode controlled high power laser system permits gain-switched spike suppression, control of cavity tuning and cavity mode selection.

2. An optical beam mode controlled high power laser system as defined in claim 1 wherein said resonator is further defined by means optically interposed between said grating and said reflective surface for correcting area distortion of said combined beam of radiant energy being directed from said grating.

3. An optical beam mode controlled high power laser system as defined in claim 2 wherein said resonator is further defined by means optically interposed between said distortion correction means and said reflective surface for magnifying a cross-sectional area of said combined beam to a cross-sectional area of said lasing medium containing means.

4. An optical beam mode controlled high power laser system as defined in claim 3 wherein said resonator is a ring resonator.

5. An optical beam mode controlled high power laser system as defined in claim 4 wherein said means for initiating said lasing action is an electron beam.

6. An optical beam mode controlled high power laser system as defined in claim 5 wherein said outcoupling means is a hole scraper mirror.

7. An optical beam mode controlled high power laser system as defined in claim 1 wherein said outcoupling means comprises means for removing a portion of said high power beam of radiant energy as said output from said laser system and means for permitting the remaining portion of said high power beam of radiant energy to pass therethrough and thereby remain in said resonant cavity.

* * * * *